United States Patent [19]

Raabe

[11] 4,126,319
[45] Nov. 21, 1978

[54] DOUBLE-ACTING PISTON

[75] Inventor: Gotthold Raabe, Stuttgart-Fasanenhof, Fed. Rep. of Germany

[73] Assignee: Robert Bosch G.m.b.H., Stuttgart, Fed. Rep. of Germany

[21] Appl. No.: 779,200

[22] Filed: Mar. 18, 1977

[30] Foreign Application Priority Data

Mar. 20, 1976 [DE] Fed. Rep. of Germany ....... 2611999

[51] Int. Cl.² ............................................. F16J 15/32
[52] U.S. Cl. ..................................... 277/152; 92/244; 277/165
[58] Field of Search ......................... 92/244, 243, 242; 277/152, 153, 165

[56] References Cited

U.S. PATENT DOCUMENTS

| 2,315,012 | 3/1943 | Park | 92/244 |
| 2,884,903 | 5/1959 | Pauly | 92/244 |
| 3,509,890 | 5/1970 | Phillips | 277/152 |
| 3,605,706 | 9/1971 | Bush | 277/152 |
| 4,042,248 | 8/1977 | Williamitis | 277/152 |

Primary Examiner—Robert I. Smith
Attorney, Agent, or Firm—Edwin E. Greigg

[57] ABSTRACT

The double-acting measuring piston of this invention is slidably positioned in a cylinder and is provided with oppositely disposed mirror image sealing members which encompass a supporting body and are retained in abutment therewith by spaced flanges. The sealing members have foil lip portions that form between them, the cylinder wall and the supporting body an annular pressure chamber. The mirror image sealing members have oppositely disposed surface areas that are subjected to chambers containing a medium pulsating at slight pressure differences.

6 Claims, 2 Drawing Figures

DOUBLE-ACTING PISTON

BACKGROUND OF THE INVENTION

The present invention relates to a double-acting piston and more particularly to a measuring piston that is guided in a cylinder and arranged to be thrust upon on both sides thereof by a medium which pulsates at slight pressure differences, the average pressure of which is substantially the same, said piston having an elastic double lipped seal that includes mirror image sealing lips that extend toward one another. The oppositely extending sealing lips encompass an annular support member and thus form a piston that is attached to a piston rod, and together with the cylinder form an annular sealing chamber.

Pistons having double lipped seals constructed in this manner are usually availed of where very large pressure differences prevail on opposite sides of a piston and particularly where pressure chambers that are situated on the two sides of the piston are required to be most effectively sealed against leakage. The pressure built up with seals of this type in the annular sealing chamber formed by the mutually facing sealing lips presses the sealing lips against the cylinder wall and thereby form a good seal admittedly at a concurrently increased frictional resistance. Thus, in many cases, because the seal is so efficient it has been found that the sealing chamber pressure can lead to a jamming effect between the piston and the wall of the cylinder.

In measuring devices or other control devices in which small volume differences are to be detected at correspondingly small pressure differences, a double-acting piston can advantageously perform this function; however, the double-acting piston must work as leak-free as possible and with an exceedingly low frictional resistance so as not to falsify the measured results.

Measuring pistons which are fitted into a measuring cylinder with a clearance of a few thousandths of a millimeter and are set into motion by means of the fluid, without supplementary sealing means, and serve to indicate volume changes and pressure changes by means of optically measured changes in position, are well known. Such a measuring piston has the disadvantage of reacting very sensitively to dirt entrained in the measuring medium and a direct articulation of a noncontacting electrical excursion sensor as a consequence is not possible with such a structure.

OBJECT AND SUMMARY OF THE INVENTION

Accordingly, it is the primary object of this invention to improve a double-acting piston of the type referred to above such as to render it applicable to deployment in measuring devices or other control devices, wherein the leakage quantities transgressing from one side of the piston to the other side shall be negligibly small—that is to say, preferably or nearly zero—and wherein the friction occurring at the sealing lips also shall be low and shall lie far below the friction occurring presently with the common known type of double lipped seal.

This objective is achieved, according to the present invention, by the fact that each disk-like element is constructed of a foil-like member at least in the region of the sealing lips. As a result practically no intrinsic forces develop at the sealing lips, and a seal constructed in this manner has proven itself very successful in practice.

It has been found to be particularly advantageous that the sealing lip portion is approximately 0.1 millimeter—preferably between 0.05 and 0.2 millimeter—thick, and a simple and precise fabrication of the sealing lip is accomplished by making the sealing element from material of one thickness which remains the same right up to the sealing edge.

A still further particularly advantageous embodiment of the measuring piston, according to the invention, is provided by the disk plates being secured between attachment flanges with each disk plate comprising a foil that is only approximately 0.1 millimeter—preferably between 0.05 and 0.2 millimeter—thick.

Yet another object of this invention is to produce the disk plates of a material having an extremely low coefficient of friction, preferably of polytetrofluoroethylene (PTFE), since they are simple to manufacture on a large scale and the presence of friction from such a disk is reduced to a negligible value.

Other objects and advantages of the present invention will be more readily apparent from a further consideration of the following detailed description of the drawings illustrating a preferred embodiment of the invention, in which:

DESCRIPTION OF THE PREFERRED EMBODIMENT

Figure 1:
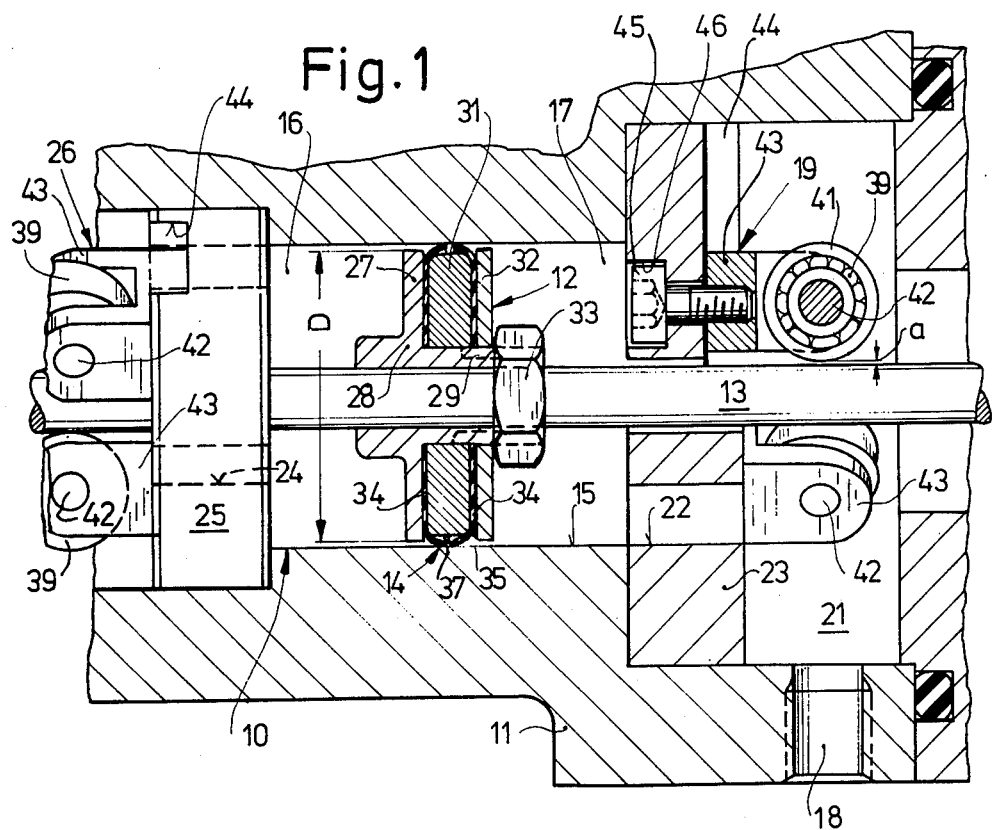
FIG. 1 is a partial longitudinal sectional and elevational view of a measuring piston as disclosed in this application.

Turning now to the drawings, a double-acting piston 12 which serves as the measuring piston is attached to a piston rod 13 and is guided in a cylinder 10 of an only partially depicted housing 11. Further details of this structure are disclosed in application Ser. No. 779,130, filed concurrently herewith by Dieter Handtmann and Gotthold Raabe. The piston 12 is provided with an elastic double lipped seal 14, described more fully hereinafter in conjunction with FIG. 2, arranged to cooperate with the contact surface designated 15 of the cylinder 10. The piston 12 divides the cylinder 10 into two chambers 16 and 17 that are sealed from one another by means of the double lipped sealing member 14, and is exposed to a fluid pressure pulsating at slight pressure differences the average value of which is substantially the same in both chambers. Via a connecting bore 18, a chamber 21 containing a bearing 19 for the piston rod 13, and several passage borings 22 distributed uniformly on the circumference of a bearing plate 23 of the bearing 19, the right chamber 17 is supplied with a pressure fluid that is maintained, in a manner not delineated further here, by means of a known pressure regulating valve or other appropriate means at a pressure averaging the same value and pulsating at slight pressure differences relative to the pressure of the fluid developed in the left chamber 16 and conducted thereto via the borings 24 in a bearing plate 25 of a second bearing 26 for the piston rod 13.

In the illustrated exemplary embodiment, the piston 12 is constructed of several disk-shaped parts and comprises a carrier component 28 provided with an integral or first abutment surface or attachment flange 27 with the carrier component 28 further including an axially extending threaded shank portion 29 which supports a disk-like member 31 and another or second flange 32, all of which are centered and kept in the assembled position by means of a nut 33. As is shown further in FIGS. 1 and 2, thin disk-like elements 34—34 which comprise a foil of a sealing material and which have an extremely low coefficient of friction, only approximately 0.1 millimeter—preferably between 0.05 and 0.2 millimeter—thick, are securely fastened about the disk member 31 and held securely to flanges 27 and 32 by the nut 33. Each of the disk-like elements 34—34 that are pressed securely against the disk-like member 31 by means of the flanges 27 and 32 further include confronting cup-shaped surfaces 35—35 (see in particular FIG. 2) that extend longitudinally of the piston 12 that is carried by the piston rod 13. The foil-like material of the disk plates 34—34 are of the same thickness throughout, i.e., up to and including the sealing edge 36 of the cup-shaped surfaces 35—35. Thus, as shown, the two disk plates 34—34 are assembled in mirror symmetry with mutually facing sealing lips 35—35 which form, together with the contact surface 15 of the cylinder 10 and with the outer skirt surface of the disk-like member 31, an annular sealing chamber 37. The two sealing lips 35—35 that form the elastic double lipped seal 14 are inclined at an extremely acute angle $\alpha$ (see FIG. 2) toward the contact surface 15 of the cylinder 10, so that, due to the cup-shaped configuration of the disk plates 34—34, the foil-like edge that forms the sealing lips 35—35 are correspondingly stiffened, and do not cock open or buckle upon the prevailing slight pressure differences. To assure an efficient seal, only the one sealing edge designated 36 must ever cooperate with the contact surface 15, that is the angle $\alpha$ must not become zero. Very good results are achieved with an angle $\alpha$ of approximately 5° to 10°, wherein the outer edge of the skirt face surface 38, constructed as a cutting surface, of the disk-like elements 34—34 serve as the sealing edge 36.

The skirt face surface 38 is advantageously produced not in the planar, but rather in the deformed or cup-shaped state of the disk-like elements 34—34 by means of the cutting of the rim thereof which makes the sealing edge 36 satisfactorily smooth. Barely measurable friction values are achieved with disk-like elements 34—34 that are manufactured, that is, are pressed into the cup-shaped form by a suitable tool and subsequently cut, from a 0.7 millimeter thick foil of polytetrafluoroethylene (PTFE).

The disk-like elements 34—34 can, of course, have any other desired form and thickness, especially when massproduced, it only being required that the region of the sealing lips 35—35 be constructed foil-like, since at greater material strengths friction is created through intrinsic strain, and the performance of the double lipped seal then merely equals that of the familiar lipped seal and it would therefore not be applicable to measuring instrument pistons.

Although a certain degree of stiffness of form is obtained by means of the depicted shape of the sealing lips 35—35, the outer diameters D of the flanges 27 and 32 remote from the sealing chamber 37 are constructed to extend almost to the contact surface 15 of the cylinder 10 in order to prevent the damaging of the sealing lips 35—35 during abnormal or sudden pressure peaks. Further, as shown in FIG. 2, the clearance between the skirt surfaces of the flanges 27 and 32 as defined by the bounding outer diameter D and the contact surface 15 measures just large enough that neither of the flanges 27 and 32 rub against the contact surface 15 during the longitudinal movement of the piston 12.

The two bearings 19 and 26 each comprise three ball bearing assemblies 39 arranged in a star-like manner (see FIG. 1), around the axis of the piston rod 13 with the outer races 41 of these bearings being arranged to lie without pressure at three points adjacent to the periphery of the piston rod 13 and are therefore mounted with some clearance so that a slight clearance "$a$" of a few hundreths of a millimeter up to approximately 0.1 millimeter is produced at the given bearing or bearings 39 relieved of any load in the assembled state. The pin-shaped axles designated 42 of the ball bearings 39 are passed into the bearing supports 43, each of which are in turn set into the radial grooves 44 of the bearing plates 23 and 25, and are thereafter secured by the screws 45. The radial grooves 44 and the diametric clearance between the screws 45 and the shouldered borings 46 in the bearing plates 23 and 25 that receive the screws 45 provide the functionally necessary adjustment of the ball bearings relative to the position of the piston rod 13, so that the clearance "$a$" described earlier can be set. The one bearing assembly 19 comprising the three ball bearings 39 is rotationally offset during the assembly by 60° relative to the other bearing assembly 26 which likewise comprises the three ball bearings 39, so that in the fully assembled relationship of these bearing assemblies, as shown in FIG. 1, one of the right bearing assemblies 19 is adjacent.

Figure 2:
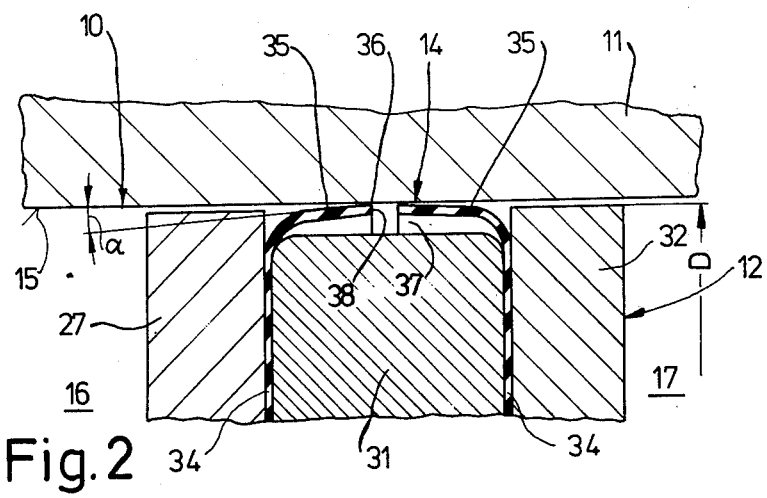
FIG. 2 is a detailed view in section of FIG. 1 in the region of the sealing lips, on an enlarged scale.

The throughflow quantity measuring apparatus depicted in FIG. 2 is constructed substantially the same as the throughflow quantity measuring apparatus of FIG. 1, and the same respective parts thereof have been provided with the same reference numerals. Thus, the throughflow quantity measuring apparatus of FIG. 2 contains a pressure differential indicating apparatus 1a, which essentially consists, as does the corresponding apparatus 1 in FIG. 1, of a measuring chamber 2a to which are attached the magnetic valves 3 and 4, respectively, that serve as the test object and as the throughflow quantity valve element, as well as the pressure differential sensor 7 comprising the measuring piston 12 and the signal transmitter 8. However, in the structure disclosed in FIG. 2, a control valve 9 constructed as an electromagnetically actuated three-way valve is additionally attached to the measuring chamber 2a, and the control valve 9 is connected—as is the throughflow quantity valve element 4—with the pressure source 5. The control valve 9 serves for the automatic maintenance of the volume extant within the measuring chamber 2a, particularly when the magnetic valve 3 serving as the test object does not convey the same throughflow quantity as does the fixedly adjusted magnetic valve 4 which serves as the standard. The control valve 9 always goes into action when the measuring piston 12 has moved a predetermined distance away from its central position. The control valve 9 as well as the measuring piston 12 remain in the rest position illustrated whenever the setting of the magnetic valve 3 effectively equals that of the magnetic valve 4, which conveys the reference throughflow quantity. Both magnetic valves 3 and 4 and the control valve 9 are actuated by means of an electrical control circuit 6a the construction of which, as well as that of the pressure source 5, is more fully explained herein below.

Turning at this time to FIGS. 3 and 4, the measuring piston 12 which is utilized for both exemplary embodiments of this invention according to FIGS. 1 and 2, is now described in greater detail.

The double-acting piston 12 that serves as the measuring piston is attached to a piston rod 13 and is provided with an elastic double-lipped opposed sealing member 14, and is guided in a cylinder 10 (see FIG. 3) of an only partially depicted housing 11 of the pressure differential sensor 7. This double-lipped sealing member 14, further depicted in FIG. 4 and described more fully further below, cooperates with the contact surface, designated 15, of the cylinder 10. The piston 12 divides the cylinder 10 into two chambers 16 and 17 that are sealed from one another by means of the double-lipped sealing member 14, and is exposed to a fluid pressure pulsating at slightly different pressures, the average value of which is substantially the same in both facing disposition of the sealing lips 35—35, a slow decay of the sealing pressure takes place in the sealing chamber 37 after momentary pressure peaks so that the friction trails large and small pressure differences dynamically. Since the pressure peaks appear alternatingly in the chambers 16 and 17, the leakage quantities are decreased by orders of magnitude relative to other well-known sealing means, whereas the frictional force is only raised imperceptibly. The utilization of PTFE with its extremely low friction factor prevents a seizing of the piston 12 in the cylinder both in the stationary as well as in the moving state.

The piston 12 disclosed in this application has proven itself particularly well suited for pressures up to 10 atmospheres, where, however, pressure differences of <0.1 atmospheres occurred during normal operation. Pressure peaks of ≈3 atmospheres and greater do not impair the durability of the piston, due to the particular design of the sealing lips 35—35 and their support provided by the flanges 27 and 32. Since the proper functioning and the durability of the piston seal depend primarily upon the occurrence of slight pressure differences and less upon the operational pressure on both sides of the piston 12, this piston can also be employed in installations having even far higher pressures.

What is claimed is:

1. In a measuring instrument: housing means within which a pressure chamber is defined; bearing means mounted to the housing means on either side of the pressure chamber; an elongated piston rod supported by the by the bearing means for reciprocal displacement along its longitudinal axis and relative to the bearing means; and a double-acting measuring piston mounted to the piston rod for reciprocal displacement within the pressure chamber,
   said piston dividing the pressure chamber into separate chambers each containing a pressure medium pulsating at slight pressure differences, and whose average pressure is similar,
   said piston including a pair of spaced, substantially parallel disposed, annular sealing members, each having foil-like sealing lip portions at their free end that extend toward each other at an angle to the pressure chamber wall which is greater than 0° and in the longitudinal direction of the piston rod into engagement with the pressure chamber wall, said sealing lip portions having a thickness of between 0.05 and 0.2 millimeters.

2. In the measuring instrument as defined in claim 1, wherein said sealing members are constructed of polytetrafluoroethylene (PTFE).

3. In the measuring instrument as defined in claim 1, wherein the sealing lip portions have a perimetral surface that extends perpendicular to the sealing members.

4. In the measuring instrument as defined in claim 1, wherein said piston further includes support means interposed between the sealing members, and plural annular flanges situated on each side of the support means for confining the sealing members into engagement with the support means.

5. In the measuring instrument as defined in claim 1, wherein said bearing means include axle portions that extend perpendicular to said piston rod.

6. In the measuring instrument as defined in claim 5, wheren each of said bearing means includes a plurality of bearings spaced about the piston rod at an angle of 60° to each other.

* * * * *

UNITED STATES PATENT AND TRADEMARK OFFICE
CERTIFICATE OF CORRECTION

PATENT NO. : 4,126,319
DATED : November 21, 1978
INVENTOR(S) : GOTTHOLD RAABE

It is certified that error appears in the above-identified patent and that said Letters Patent are hereby corrected as shown below:

Column 4, Line 10, "hundreths" should be -hundredths-

Column 6, Line 5, after "the" delete -by the-

Signed and Sealed this

Twelfth Day of June 1979

[SEAL]

Attest:

RUTH C. MASON
Attesting Officer

DONALD W. BANNER
Commissioner of Patents and Trademarks